United States Patent [19]

Bedi et al.

[11] Patent Number: 5,145,033
[45] Date of Patent: Sep. 8, 1992

[54] SANDWICH ADAPTER REUSABLE OIL FILTER MOUNTED TO SAME AND PROCESS FOR USING THE SAME

[75] Inventors: Ram D. Bedi; Adrianus J. van der Griendt, both of Birmingham, Mich.

[73] Assignee: K.J. Manufacturing Co., Wixom, Mich.

[21] Appl. No.: 553,790

[22] Filed: Jul. 17, 1990

[51] Int. Cl.⁵ .............................................. F16N 33/00
[52] U.S. Cl. ...................................... 184/1.5; 184/6.24; 123/196 A; 134/169 A; 134/170; 134/102.1
[58] Field of Search ................ 184/1.5, 6.21, 6.24, 184/105.3; 123/196 R, 196 A, 198 A, 198 DA; 141/65; 134/102, 169 R, 169 A, 170, 37, 40, 22.18, 22.19

[56] References Cited

U.S. PATENT DOCUMENTS

| | | | |
|---|---|---|---|
| 1,766,847 | 6/1930 | Tibbetts | 184/6.24 |
| 1,884,820 | 10/1932 | Osborne | 184/1.5 |
| 2,425,848 | 8/1947 | Vawter | 184/1.5 |
| 2,454,585 | 11/1948 | Alderman | 184/1.5 |
| 3,431,145 | 3/1969 | Riley | 134/22.19 |
| 3,448,746 | 6/1969 | Butler | 134/102 |
| 4,193,442 | 3/1980 | Vian | 184/104.3 |
| 4,369,110 | 1/1983 | Picek | 123/196 A |
| 4,406,784 | 9/1983 | Cochran | 123/196 A |
| 4,433,656 | 2/1984 | Norwood | 123/196 A |
| 4,776,431 | 10/1988 | Poling | 141/65 |
| 4,854,277 | 8/1989 | Kenney | 123/196 A |
| 4,909,205 | 3/1990 | Bewley, III | 184/1.5 |
| 4,967,776 | 11/1990 | Folmar | 134/169 R |

FOREIGN PATENT DOCUMENTS 0109714  8/1980  Japan ..................................... 184/1.5

Primary Examiner—Ira S. Lazarus
Assistant Examiner—Alan B. Cariaso
Attorney, Agent, or Firm—Basile and Hanlon

[57] ABSTRACT

Disclosed is a permanent liquid filter assembly, which includes an oil filter unit made up of an outer housing with inlet and outlet ports and a reconditionable filter material and a bypass valve means for providing a passage way between the inlet and outlet ports, when the differential pressure across the filter means exceeds a certain predetermined value contained therein. The assembly also includes an adapter with multiple inlet and outlet ports, providing fluid communication means between the inlet and outlet ports of the filter and the oil inlet and outlet ports of the engine block to which the filter assembly is attached, as well as inlet and outlet ports for making fluid connections with an external pump device by means of fluid quick disconnet couplers, thereby enabling a flushing fluid to be pumped through the filter element in a reverse direction opposite that of the oil normal flow. This procedure facilitates dislodging and removing contaminant particles from the oil filter material thereby essentially reconditioning the filter means for further continued use, without having to remove the filter. In addition, the adapter configuration of the present invention allows the introduction of fresh engine oil under pressure into the reconditioned filter.

12 Claims, 3 Drawing Sheets

SANDWICH ADAPTER REUSABLE OIL FILTER MOUNTED TO SAME AND PROCESS FOR USING THE SAME

BACKGROUND OF THE INVENTION

1. Field of the Invention

This invention relates to a device for use in conjunction with an oil filter to facilitate rapid cleaning and oil change of an associated engine and, optionally, to permit reconditioning of a suitable oil filter. This invention also relates to permanent or reusable oil filters for use with internal combustion engines. Finally, this invention relates to a method for changing motor oil and, optionally, flushing and cleaning the motor oil reservoir, crankcase components, and oil filter in an internal combustion engine.

2. Description of the relevant art

Filters capable of removing contaminants from organic liquids such as fuels and oils are well known. One such example, oil filters, are typically located in an oil circulation line of an internal combustion engine downstream of the associated oil pump. The function of the oil filter is to remove particulate and other contaminants from the lubricating oil in order to enhance engine life and performance.

The typical oil filter consists of a cylindrical housing having suitable means for permitting attachment of the filter to the engine block. The housing contains filtration media suitable for filtering particulates from the oil as it flows through the filter housing on its way back to the engine block. The attachment means, ordinarily located at one end of the filter housing, is adapted for mating contact with the engine block so as to provide two separate avenues of fluid communication: one between the oil pump discharge line and the filter inlet opening; and the other between the filter outlet opening and the internal lube oil passages leading to the various lubricating points in the engine. Connection between the filter outlet and the engine block is generally accomplished by means of a central opening in one end of the filter housing which is internally threaded to receive an externally threaded conduit protruding from the engine block. The oil from the engine generally enters the filter through a number of holes in the housing which surround the central opening. After passing through the filter, the oil reenters the engine block via the conduit. A gasket surrounding the housing perimeter outside the perimeter of the inlet holes seals the filter unit against the engine block.

During engine operation, particulate and other contaminants caused by the abrasive wear of the engine parts are circulated by the lubricating oil and collected in the filter. With continued use, the effectiveness of the filter gradually diminishes with corresponding increase in the resistance across the filtration media causing oil pressure upstream of the filter unit to increase and the down stream flow of oil to diminish. In most conventional automotive operations, once the upstream oil pressure reaches a predetermined level, a bypass valve either incorporated in the filter housing or in the engine block itself will open to relieve the pressure and restore oil flow. This allows unfiltered oil to reenter the engine block and travel to the lubricating points. Even though it is undesirable to lubricate with unfiltered oil, it is better than having no lubrication at all, as the latter situation would cause almost certain engine failure.

For optimum performance and engine longevity proper filtration of the engine lubrication oil is essential. In current practice, oil filters are replaced at regular intervals, usually concurrent with an oil change. Oil filters currently in use vary in size, shape and thread size to correspond with a particular engine. These are not readily interchangeable. Thus a variety of various sizes must be manufactured to make filters available for all makes and models of cars.

Disposal of the spent oil filters poses a large and environmentally sensitive problem. The number of passenger cars and light trucks registered in the United States in 1988 was 153 million. It is estimated that the average frequency of oil changes is 2.94 times per year for each vehicle. It is also estimated that the oil filter is changed during 90% of the oil changes. This amounts to the disposal of approximately 400 million oil filters in 1988 alone. These spent oil filters each containing residual waste oil find their way into the nation's trash adding to already critical waste disposal and pollution of the nation's land and water resources. Furthermore, these spent filters must be replaced with newly manufactured products causing an unnecessary waste of natural resources, such as metal for the housing material, cellulose materials for the filtration media, and the manpower required to produce them.

Thus it is desirable to provide a convenient, environmentally safe, no-mess alternative to conventional oil filter changes which eliminates or reduces the amount of waste and pollution generated by the discarding of disposable oil filters containing residual spent oil. It is also desirable to provide a method and device which provides an alternative to the use of disposable oil filters which is economical to the consumer and supports and complies with the spirit and intent of current and proposed legislation regarding waste reduction, pollution abatement and conservation of natural resources.

SUMMARY OF THE INVENTION

The present invention is a process and apparatus for facilitating rapid oil change and high speed flush cleaning of any mechanism having a system for lubricating its movable parts and an associated lube oil filtration system. It is contemplated that one particular mechanism with which the present invention may be employed is an internal combustion engine having a crankcase and an oil pan.

The apparatus of the present invention generally comprises a filter unit and a filter unit mounting adapter connected thereto. The filter unit mounting adapter is directly insertable into the mechanism such as an internal combustion engine to establish fluid communication between the lube oil distribution passages contained in the mechanism and the filter unit. The mounting adapter generally is a sandwich adapter having a first face adapted to sealingly contact and surround a suitable opening in the lube oil distribution passages such as the oil filter mounting boss on an internal combustion engine block. The sandwich adapter also has a second face adapted to sealingly connect with filter unit.

The sandwich adapter includes means for conveying oil from the operating mechanism through the filter unit and back into the lube oil distribution passages during normal mechanism operation as well as means for the introduction and removable of a suitable environmentally safe flushing fluid to and from the interior of the filter unit in a fluid flow direction in the reverse of that established for lube oil conveyance. The conveying means can optionally include inlet and outlet conduits attached to the associated inlet or outlet port. A suitable portion of a quick connect coupling member can be attached to the terminal end of each conduit. The mating ends of the respective quick connect conduits are attached to supply lines which are, in turn, connected to a suitable external pump device.

The present invention is also directed to a reusable oil filter which may be employed in the apparatus of the present invention. The reusable oil filter is composed of an outer housing having suitable fluid inlet and outlet apertures which defines an internal cavity which contains suitable reconditionable filtration media and means for directing fluid flow therethrough. The filtration media may be composed of any durable material resistant to degradation by contact with suitable flushing fluid and having a suitable opening size to retain particulate and contaminants above a certain predetermined size when fluid passes through in a first normal operational flow direction and permit release of the entrained particles when fluid flow is reversed.

In the oil change and flush cleaning process of the present invention, spent or dirty oil may be removed from the oil pan by any suitable means. Simultaneous with oil removal or immediately thereafter a suitable flushing fluid may be introduced through an exterior inlet opening located in the sandwich adapter. 10 A portion of the flushing fluid is conveyed across the filtration media in the reverse direction of normal lube oil flow, thereby dislodging and removing contaminants. Particulates dislodged from the filtration media are conveyed with the flushing fluid out of the filter through an exterior outlet opening located in the sandwich adapter. Because of the configuration of the internal lube oil passages and the engine components, relatively high pumping pressures are required to convey fluids such as lube oil through this system as compared with the pressure required to convey a fluid such as a flushing fluid through the sandwich adapter and oil filter unit. Because of this fact, flushing fluid is introduced into the apparatus of the present invention at a pressure lower than the pressure produced by the oil pump. Introduction of the flushing fluid at the lower pressure prevents essentially all conveyance of the introduced flushing fluid into the lube oil passages system as the introduced flushing fluid will follow the less resistant path.

BRIEF DESCRIPTION OF THE DRAWING

In the present description, reference is made to the following drawing in which like materials are used to refer to like elements throughout the various views and in which.

DESCRIPTION OF THE PREFERRED EMBODIMENT

Figure 1:
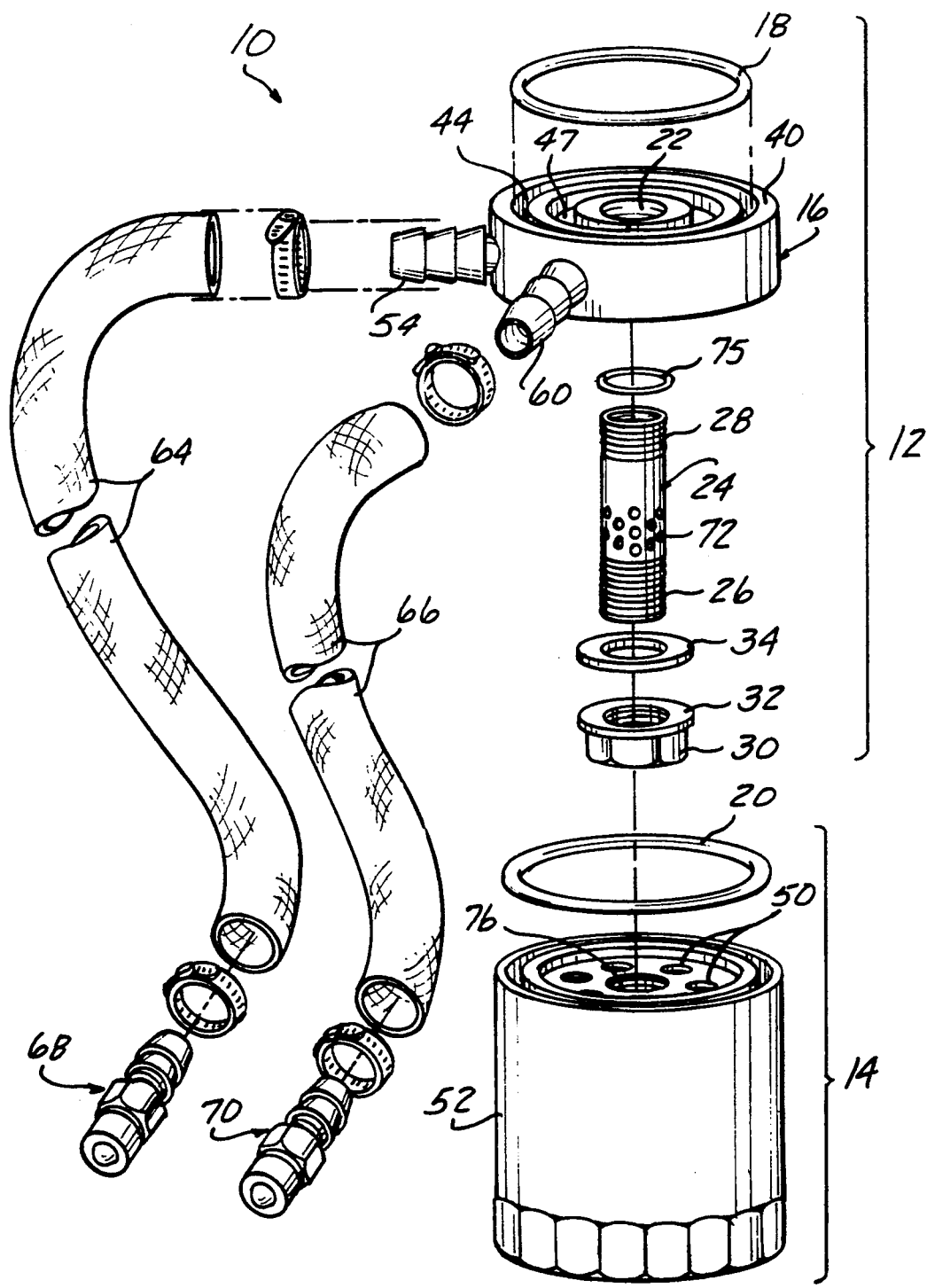
FIG. 1 is an exploded view of the oil filter adapter of the present invention and a suitable oil filter.

The basic process of the present invention can be successfully employed with vehicles or stationary power plants having internal combustion engines which have oil pans or similar oil reservoirs and internal lube oil distribution systems. The term "internal lube oil distribution passage system" is defined as, but not limited to, the passages and circulation systems present in the engine block, cylinder head, crank shaft, cam shaft, and connecting rods. Various engines will have differing lubrication requirements. Therefore is to be understood that every engine may or may not have passages or circulation systems in all the enumerated components.

THE APPARATUS

The apparatus 10 of the present invention is a filtration device composed of a mounting adapter 12 and a suitable oil filter unit 14. The oil filter unit 14 may be a suitable disposable unit such as those currently commercially available or it may be a reusable unit similar to the one which will be described in greater detail subsequently.

The mounting adapter 12 includes a sandwich adapter 16 and suitable means for sealing and connecting the sandwich adapter 16 to the internal combustion engine block E and a suitable oil filter unit 14. The sealing means can include a suitable O-ring or gasket 18 disposed between the sandwich adapter 16 and the engine block E and a second O-ring or gasket 20 disposed between the sandwich adapter 16 and the filter unit 14. Mounting of the sandwich adapter 16 to the engine block E can occur in any manner desired. Similarly, attachment of the oil filter unit may be effected by any suitable means. In the preferred embodiment the elements are attached to one another in a semi-permanent manner as it is expected that the various elements will only have to be removed on rare occasions where service or maintenance is required. It is within the purview of this invention to construct an apparatus in which the filter unit 14 and sandwich adapter 16 comprise a unitary member. It is also within the purview of the present invention that the sandwich adapter 16 be constructed or assembled in an integral fashion with the engine block E.

Figure 2:
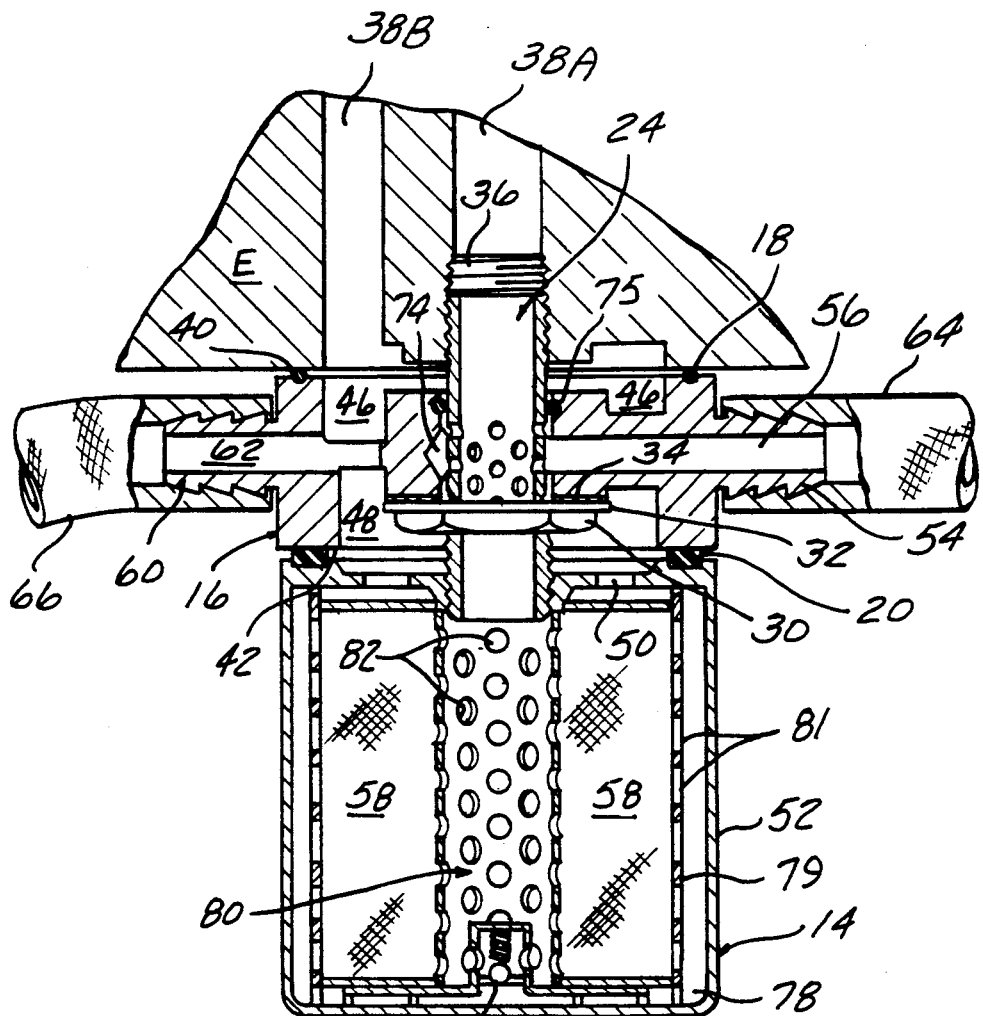
FIG. 2 is a cross-sectional view of the filter and adapter assembly of the present invention.
Figure 3:
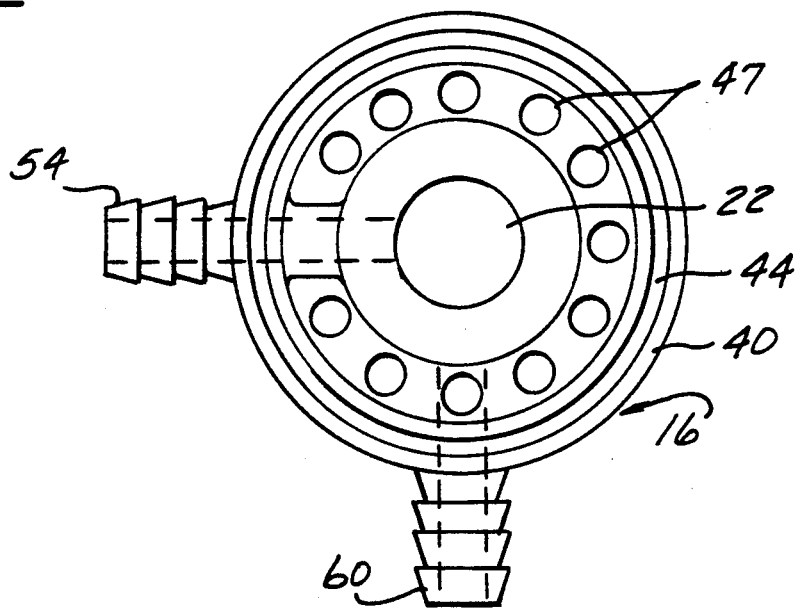
FIG. 3 is a top view of the sandwich-type oil filter adapter of the present invention.

In the preferred embodiment, the sandwich adapter 16 has a central through bore 22 into which a nipple 24 can be inserted. The nipple 24 is preferably a hollow cylindrical tube having a pair of opposing ends with exterior threaded regions 26,28 located adjacent thereto. The nipple 24 is of sufficient length such that the opposed threaded regions 26, 28 extend beyond the related surfaces of the sandwich adapter 16 when the nipple 24 is inserted in central through bore 22. Threaded region 26 is adapted to receive a mating nut 30 and associated washers 32 and seal 34 positioned on the portion of the nipple 24 proximate to the filter unit 14. Threaded region 28 is adapted to be threadingly inserted into a mating threaded opening 36 (shown in FIG. 2) in the internal lube oil distribution passage system 38A in the engine block E. Threaded region 28 maintains the nipple in fluid contact with the internal lube oil distribution passages 38A. Nut 30 in conjunction with washer 32 and seals 18 and 34 maintains the sandwich adapter 16 in a fixed fluid-tight relationship relative to the internal lube oil distribution passages 38.

The threaded region 26 extends beyond the distal end of nut 30 to maintain the oil filter unit 14 in fixed relation relative to the mounting adapter 12.

The sandwich adapter 16 has a first, engine-oriented face 40 and a second, filter-oriented face 42 opposed and parallel to the first face 40 and perpendicularly oriented relative to the central through bore 22. The first engine oriented face 40, preferably has an outer annular groove 44 extending along its periphery adapted to matingly receive O-ring 18. The sandwich adapter has a main collection chamber defined therein. This main collection chamber includes an upper collection chamber 46 located in the engine-oriented face 40 interior of the annular groove 44 and a lower collection chamber 48 which is located on the second filter oriented face 42. The upper collection chamber 46 has at least one opening in fluid communication with oil distribution channel 38B which conveys oil from the oil pump to the oil filter unit 14. The oil collection chamber may have any suitable configuration to facilitate the conveyance of the oil to be filtered into the oil filter unit 14.

A lower collection chamber 48 is located in the second filter-oriented face 42. In the preferred embodiment, the lower collection chamber 48 is adapted to overlay oil inlet apertures 50 located in the oil filter unit housing 52. Interposed between the two collection chambers 46, 48 are appropriate means for permitting the flow of engine lube oil from upper collection chamber 46 into lower collection chamber 48. In the preferred embodiment, the flow permitting means is a plurality of apertures 47. Reliance can be made upon the tightly meshing one-way gear pump P located in the engine oil pan and the close tolerance of the internal lube oil passage system to prevent excessive flow of the introduced flushing fluid into the oil pan or engine parts.

The sandwich adapter 16 of the apparatus 10 of the present invention also has a flushing fluid inlet port 54 located thereon opening to a lateral channel 56 which communicates directly with the central through bore 22. Central through bore 22 is in fluid communication with filtration media 58 located in the oil filter housing 5 and also with the opening into oil distribution passage 38A. Thus, flushing fluid introduced into the sandwich adapter 16 through inlet port 54 can be conveyed through the filtration media 58.

Also located on the sandwich adapter 16 is a flushing fluid exit port 60 in fluid communication with an exit channel 62 which communicates with the lower collection chamber 48 for conveying flushing fluid away from the filter unit 14. Connected to inlet port 54 and flushing fluid exit ports 60 are hoses 64, 66, respectively which terminate in quick connect couplings 68, 70, adapted to be matingly received in any suitable external pump device such as that described in U.S. Ser. No. 413,008 the specification which is incorporated herein by reference. It is to be understood that the inlet port 54 and exit port 60 can be located at any respective positions along the outer diameter of the sandwich adapter 16.

The mounting adapter 12 of the present invention includes a threaded nipple 24 which extends through the central through bore 22 in the manner described previously. The nipple 24, preferably, has at least one aperture 72 centrally located in the nipple wall to permit flushing fluid introduced through the flushing fluid inlet channel 56 to enter the central hollow interior of the nipple 24. In the preferred embodiment, a plurality of nipple apertures 72 are positioned to correspond to the flushing fluid inlet channel 56. In this way, flushing fluid introduced through the inlet channel 56 can enter the nipple rapidly through a number of orifices and pass through the filter media 58 in a manner which will be described in detail subsequently. Optionally, the through bore 22 may include an annular chamber 74 to facilitate fluid flow from the inlet channel 56 through the apertures 72.

The mounting adapter 12 is configured to make sealing connection with a suitable oil filter unit. In the preferred embodiment, the second threaded region 26 of the nipple 24 is adapted to be threadingly insertable in a central threaded outlet 76 located in the oil filter housing 52. In the preferred embodiment, a plurality of oil inlet apertures 50 surround the central threaded outlet to permit fluid communication between the interior chamber 78 containing filtration media 58 and the various exterior chambers and orifices.

The filter unit 14 may be either reconditionable or disposable as desired. In the preferred embodiment, the filter unit 14 contains a durable reusable filtration material. This 10 material can be any sieve-like or mesh-like material capable of retaining particulate contaminants above a certain size until released by suitable operations on the filtration material. The filtration material is resistant to solvents and fluid flow induced friction caused by the passage of fluids therethrough in an essentially wear-resistant manner. The filtration material is, preferably, made out of a durable material such as stainless steel having a predetermined mesh size. The filter element is, preferably arranged in a pleated format to increase the effective filter area within the confines of the filter housing 52. A cylindrical guard 79 may be placed around the filter element 58 to keep it in place during the flushing operation portion of the process of the present invention at which time the fluid flow direction and concomitant pressure across the filtration is reversed in a manner which will be described in more detail subsequently. The guard 79 may be made out of metal or any other suitable material. The guard 79 contains a plurality of apertures 81 of sufficient size to permit fluid flow through the entire oil filter unit 14 while retaining the filtration material 58 in place.

In addition to a suitable filtration material, the filter unit 14 of the present invention also includes means for directing the direction of flow of fluids introduced therein. In the preferred embodiment, lube oil to be filtered enters the oil filter through oil pump discharge passage 38B. The oil to be filtered passes into the inner cavity 78 in the filter unit housing 52 through apertures 50. In the cavity 78, it is brought into contact with filter media 58. The oil passes through filter media 58 into central collection shaft 80 which has a plurality of openings 82 which permits passage of the filtered oil from the outside in. From there, the oil can pass into the nipple 24 and back into the internal oil distribution passage 38A.

In the event that the oil filter unit 14 should become clogged so as to effectively prevent adequate flow of oil to the engine block E, a bypass valve assembly 83 is provided in the oil filter 14 to permit an alternate oil flow path. Such bypass assemblies are well known in the art and may consist of a spring loaded valve mechanism which will open a predetermined pressure to insure an adequate, though unfiltered, flow of lube oil to the various engine parts until oil change and/or flush cleaning can be performed.

When flush cleaning is desired, flushing fluid may be introduced through the inlet port 54 in the sandwich adapter 16 and on through the nipple 24 to permit entry of essentially all of the flushing fluid through the central collection shaft 80. The flushing fluid exits the central collection shaft 80 through apertures 82 and comes into contact with the filtration media 58, dislodging contaminants retained thereon. The used flushing fluid can exit the filter unit through apertures 50 where it then collects in fluid collection chamber 48 before being conveyed out of the sandwich adapter 16 through exit port 60.

The apparatus 10 may be employed independently or in conjunction with other pump-out and cleaning means such as various drain plug and dipstick devices such as those disclosed in U.S. Ser. No. 516,243 and 490,082, the specifications of which are herein incorporated by reference.

Suitable suction and pumping pressure can be provided by any appropriate external pumping and suction means such as the system discussed in Ser. No. 433,355; the disclosure of which is incorporated by reference herein. A suitable fluid removal and introduction system is also set forth schematically in FIG. 4.

Figure 4:
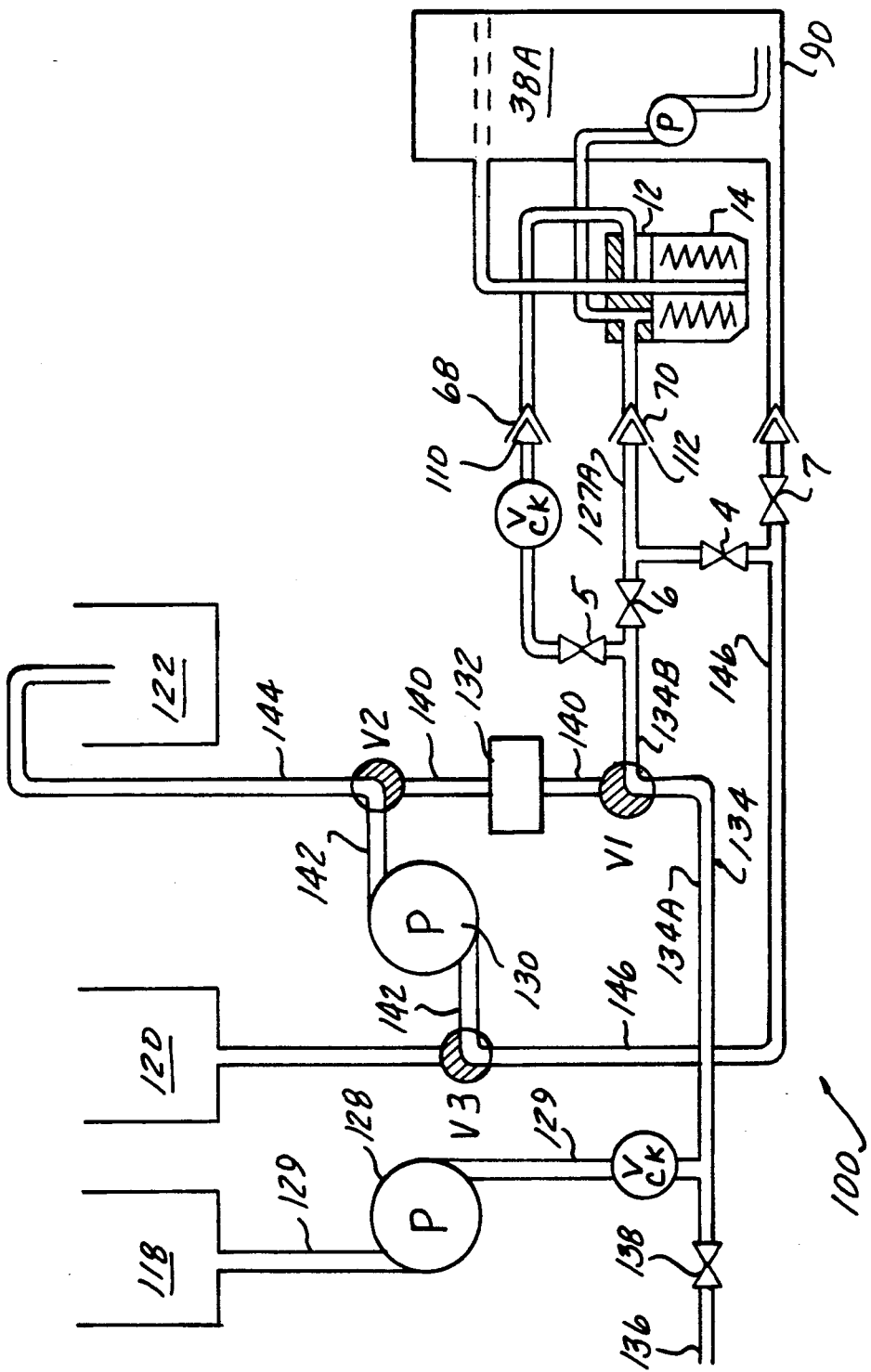
FIG. 4 is a schematic flow diagram depicting fluid flow through the filter and the sandwich-type oil filter adapter of the present invention when coupled with an internal combustion engine having an internal lube oil passage system and coupled to an external pumping device.

In the process of the present invention, a suitable oil filter can be releasably placed in fluid communication with a suitable external pump device 100. Preferably, this oil filter is reconditionable by the method of the present invention and is, preferably, a permanent oil filter 14 as depicted in FIG. 4. When using the filter mounting apparatus of the present invention, this can be accomplished by the attachment of quick connect coupling members 68, 70 to mating quick connect coupling members 110, 112 located on the external pump device 100. The external pump device 100 conveys flushing fluid and fresh oil from suitable holding tanks 11B, 120 to the oil filter mounting adapter 12 and spent oil and used flushing fluid from the mounting adapter 12 and oil filter and/or engine oil pan 90 to a suitable waste fluid receptacle 122.

The external pump device 100, preferably includes valves and conduits for directing the flow of fluids to and from the filter mounting adapter 12 and/or engine oil pan. In the preferred embodiment, the external pump device 100 contains a plurality of fluid-directing valves which will be discussed in greater detail subsequently. The pump device 100 also includes suitable means for actuating any combination of the various fluid-directing valves as desired. Actuation can occur manually or mechanically and can be computer-controlled or manually operated in any conventional manner.

The external pump device 100 of the present invention also includes means for routing and moving fluids within the external pump device 100 as well as to and from the mounting adapter 12 and/or engine oil pan 90. The moving means generally includes at least one pump mechanism as well as appropriate fluid conveying conduits. In the preferred embodiment, the external pump device 100 includes a dedicated fresh oil pump 128 and a pump 130 which is capable of exerting either a pumping or a suction action to advance clean flushing fluid from the flushing fluid holding tank 120, recirculate flushing fluid from the mounting adapter 12, and finally, move spent flushing fluid and waste oil to the waste receptacle 122.

The external pump device 100 of the present invention also may include at least one suitable flushing fluid filtration unit 132 capable of removing particulate material dislodged from the oil filter unit 14 and carried by the flushing fluid stream as it passes. The external flushing fluid filtration unit 132 may have any desirable configuration and be located at any point in the conduit system of the external pump device 100 which will permit filtration and recirculation. In the preferred embodiment, the external flushing fluid filtration unit 132 is located in the filtration unit line 140 which itself is located between the main fluid conveying line 134 and the flushing fluid pump line 142. Filtration unit line 140 can be brought into fluid communication with the pump 130 by the proper orientation of three-way valves V1, V2 and V3.

The external pump device 100 also may include means for permitting gas purging operations. In the preferred embodiment, the pump device 100 includes a main fluid conveying line 134 to which a suitable air purge line 136 and a source of compressed gas (not shown) are connected. In this manner, a suitable pressurized gas can be conveyed through the external pump device 100 to the appropriate opening in the mounting adapter 12. The compressed or pressurized gas may be any non-reactive gas. The material is, preferably, essentially free from residual water and is selected from the group consisting of compressed air, nitrogen, inert gasses, and mixtures thereof. The source of pressurized gas may be located outside the external pump device 100 and may be either a gas compressor unit or cylinders of suitable pressurized gas. Also associated with the source of pressurized gas is a suitable means from regulating the flow of that gas to the mounting adapter 12. Preferably, the regulating means is a suitable valve 138 which may be interposed between the main fluid conveying line 134 and the air purge line 136.

In the preferred embodiment, the main fluid conveying line 134 includes an two-way valve V1 which is movable between a first position in which fluid communication is established between the upstream portion 134A and the downstream portion 134B of main fluid conveying line 134 and a second position in which the downstream portion 134 B of the main fluid conveying line 134 is in fluid communication with filtration line 140 in which the external flushing fluid filtration unit 132 is preferably located.

Fluid communication between the pump line 142 and waste conveying line 144 is established by proper orientation of three-way valve V2 to its first position as shown in FIG. 4 from its second position establishing fluid communication between filtration unit line 140 and pump line 142. The purpose of the second position for valve V2 will be described in greater detail subsequently.

In order to establish communication between waste receptacle 122 and the main waste line 146, three-way valves V2 and V3 are maintained in the first position as shown in FIG. 4. In this position, valve V3 establishes fluid communication between pump line 142 and main waste line 146 and three-way valve V2 establishes fluid communication between pump line 142 and waste conveying line 144. In this manner, spent flushing fluid can be conveyed from the mounting adapter 12 of the present invention through the valve 4, through main waste line 146 into flushing fluid pump line 142 on to waste conveying line 144 and waste receptacle 122.

THE PROCESS

The process of the present invention is directed to a method for cleaning an oil filter unit and comprises the following steps:

removing residual oil contained in the oil filter unit;
introducing an amount of a suitable flushing fluid into the oil filter unit;
circulating the introduced flushing fluid within the filter unit in a manner which removes particulates and contaminants contained in the filter unit;
removing the circulated flushing fluid from the filter unit after the circulation step is completed; and
introducing a measured portion of fresh oil into the filter unit after the flushing fluid has been removed.

The oil filter cleaning process of the present invention is generally performed in conjunction with an overall oil change operation. The term "overall oil change operation" refers to the procedure in which spent engine lubricating oil is removed from the engine crankcase and oil pan and replaced with fresh lubricating oil. This includes, but is not limited to, procedures in which all or the great majority of the spent oil is completely removed from the engine compartment and replaced with fresh material. It is contemplated that the filter flushing process of the present invention may be employed simultaneously with any desired overall oil change operation. An example of one such suitable overall oil change operation is found in U.S. Pat. No. 4,884,660, the specification of which is herein incorporated by reference. The flushing operation may be performed at regular intervals or whenever desired by the operator. When employed with the mounting adapter 12 of the present invention, the flushing process may successfully be employed between oil changes if desired.

Residual oil may be removed from the filter and added to the lube oil residing within the engine, where it may remain or, in the case of an overall oil change, be collected for recycling or disposal in a suitable manner. Residual oil is removed by the application or gas pressure exerted on exit channel 62 of sandwich adapter 16. Upon application of pressure, the residual oil is pushed out of the internal cavity 78 of the engine oil filter unit such as filter unit 14 shown in FIGS. 1 and 2, through central collection shaft 80 and apertures 82 via nipple 24 of the adapter and the internal lube oil distribution passages 38A, into the oil pan 90.

Once the residual oil has been removed from the filter unit 14, a suitable flushing fluid is then introduced into the unit 14 through the inlet port 54 in the sandwich adapter 16 and on through apertures 72 located in the nipple 24 to permit entry of the flushing fluid through the central collection shaft 80, in a direction reverse to that of ordinary oil flow. The flushing fluid may be any material or composition which is miscible with motor oil and exhibits suitable detergency and cleaning characteristics but is inert to the oil filter unit, mounting adapter and any engine components but is capable of dislodging particulate material from the filtration material 58. The flushing fluid employed is, preferably, one which is compatible with waste oil and is not detrimental in any subsequent waste oil recycling processes and one which does not deposit undesirable constituents which may adhere to the filtration material and the surfaces of the oil filter unit and the filter mounting adapter.

In the preferred embodiment, the flushing fluid employed contains a solvent miscible with oil, a compatible detergent capable of improving the detergency of the flushing fluid and a lubricating additive capable of enhancing the sheeting action of the flushing fluid.

The detergent employed in the present invention is an organic fluid selected from the group consisting of butyl cellosolves. The butyl cellosolve is employed in sufficient concentration to provide detergency in the flushing fluid.

The lubricating additive employed in the flushing fluid is, preferably, a methyl ester having a carbon chain between twelve and twenty carbon atoms or mixtures of various such methyl esters in an amount sufficient to provide lubricity to the flushing The solvent employed in the preferred embodiment is an organic fluid selected from the group consisting of high flash point kerosene and mixtures thereof. The flash point of the kerosene employed is, preferably, above about 150 degrees Fahrenheit. It is to be understood that other solvents having similar characteristics to high flash point kerosene may be employed in admixture with or substituted for the kerosene. The amount of flushing fluid introduced and the duration of its contact time with the filtration media will vary depending on the type and condition of the filtration media, the nature and amount of the contaminants contained thereon, and the tenacity with which the contaminants adhere to the filter housing and the filtration media.

In the process of the preferred embodiment, the flushing fluid is permitted to actively recirculate through the filtration media in a counter-current flow direction essentially opposed to the flow direction of lubricating oil during normal engine operation. During the flushing fluid recirculation step, the flushing fluid is permitted to enter and exit the engine oil filter in a circuit that includes the sandwich adapter, the engine oil filter itself, a suitable pump or other circulating devise, and external filtration device capable of removing particulate contaminants dislodged from the engine oil filter and carried in the flushing fluid stream. The flushing fluid exiting the engine oil filter and sandwich adapter will contain amounts of dislodged contaminants. The contaminated flushing fluid is then brought in contact with the external filtration media to remove the dislodged contaminants before the flushing fluid is reintroduced into the oil filter being cleaned and reconditioned.

The recirculation cycle can continue for an interval sufficient to remove the desired percentage of particulate contaminants from the filtration material in the oil filter. Once the desired level of contaminants are removed from the filter unit, the flushing fluid is conveyed to a suitable waste fluid receptacle 122 for reuse, recycling or appropriate disposal. If the cleaning situation warrants, multiple flushing and recirculating steps can be performed.

It is to be understood that a small portion of the flushing fluid may remain in the oil filter unit after the greater portion of the fluid has been conveyed away from the oil filter unit. In certain instances it may be desirable to purge the newly cleaned oil filter of this residual fluid before introducing fresh oil into the filter unit. The optional purging step is preferably accomplished by the introduction of a suitable purge gas through the filter unit. When purging is desired, a stream of the purge gas is introduced into the filter unit in the direction opposed to fluid flow under normal oil filter operation. The purge gas is introduced under sufficient pressure to push any residual solvent out of the filter unit. The introduced purge gas is one which is capable of volatilizing and/or mechanically carrying the residual solvent out of the filter unit. In the preferred embodiment, the purge gas chosen is anhydrous, and essentially non-reactive with the flushing fluid, the spent oil and the materials of the filter unit itself. Suitable materials are selected from the group consisting of compressed air, nitrogen, inert gasses and mixtures thereof.

After the flushing fluid has been removed from the filter unit, fresh engine lube oil can be added to the oil filter unit through sandwich adapter, through the conventional oil filter inlet apertures and into the oil filter housing in the direction of normal lube oil flow. The amount of fresh oil added through the engine oil filter will vary from vehicle to vehicle as well as from process application to process application. Thus, the amount of oil introduced may be an amount sufficient to replace all spent engine oil or may be as little as the amount necessary to prime the oil filter. In either situation, addition of fresh oil through the engine oil filter permits entry of a portion of that oil into the internal engine oil passages, thereby prelubricating the various engine components as well as providing a full oil filter at the time of engine start up. This feature eliminates the momentary starvation of lubricating oil experienced in conventional procedures in which the lube oil must first fill the empty filter before it reaches the various lubricating points.

In order to better understand the process of the present invention, reference is now made to the schematic diagram shown in FIG. 4 and FIGS. 1, 2 and 3. During normal engine operation, engine lubricating oil is drawn from the oil pan 90 by the oil pump P and discharged into the oil filter unit 14 through the main fluid collection chamber in mounting adapter 12. The lubricating oil enters the oil filter unit through inlet apertures 50 and passes through filtration material 58. The filtered oil enters a central core within the filter housing, consisting of perforated central collection shaft 80 and leaves the oil filter unit 14 through the central opening 76. The filtered oil, then, passes through the sandwich adapter 16 through nipple 24 which is connected to engine block E in fluid communication with the engine lubricating passages 38A.

At regular intervals, or whenever desired by the operator, the permanent oil filter unit 14 may be flushed in order to recondition the filtration material 58 and restore its effectiveness. This would normally be done in conjunction with an overall engine oil change employing an external pumping device such as the one depicted in FIG. 4 and described previously.

To remove residual oil from the oil filter unit 14, the unit is purged with a suitable purge gas such as air. To accomplish this using the external pump device 100, valves 4, 5 and 7 are closed during the purging step. Valve 6 remains open during the purging step. Three-way valve V1 is oriented to its first positions as depicted in FIG. 4. Gas valve 138 is then opened to permit the pressurized purge gas to pass into main fluid conveying line 134. The purge gas is conveyed through main fluid conveying line 134 through valve 6 where it is directed into line 127A. From there, the purge gas passes into the inlet port 60 of sandwich adapter 16 through coupling members 70, 112 and associated inlet hose 66. The introduced purge gas enters the oil filter unit 14 through the inlet apertures 50 and the engine oil filter media forces residual oil held in the housing out through the central collection shaft 80 and nipple 24 into the oil distribution passages 38A and the oil pan 90.

Once the residual oil is purged from the filter, the gas valve 138 is closed. Valves 4 and 5 are opened and valve 6 closed, and valves V1, V2 and V3 are oriented to their second positions to establish fluid communication between the second portion of fluid conveying line 134B and the clean flushing fluid storage tank 120. Pump 130 is activated to introduce a predetermined amount of flushing fluid into the oil filter unit 14. Once this is accomplished, pump 130 is temporarily shut down until valve V3 is returned to its first position thereby establishing a recirculation circuit whereby flushing fluid is recirculated through the engine oil filtration media 58 in a reverse flow direction, thereby dislodging particulates and other contaminants. These contaminants are subsequently filtered out by the external filtration unit 132 located in filtration unit line 140 on external pump device 100.

Upon completion of the flushing cycle, pump 130 is again temporarily stopped, while valves V1 and V2 are rotated to their first positions. Pump 130 is activated, to remove the spent flushing fluid and gas valve 138 is opened. This action permits the pressurized gas to push any residual flushing fluid from the oil filter unit 14 where it is being pumped into waste receptacle 122, together with the other flushing fluid.

In situations in which the flushing is being conducted in conjunction with an overall oil change operation, the flushing recirculation cycle would be followed by temporarily shutting down pump 130 while repositioning valves V-1 and V-2 to their first positions, closing valves 4 and 5 and opening valves 6 and 7. Valve 138 is then opened pushing the residual flushing fluid from the filter unit 14 through the central collection shaft 80, the nipple 24 and the oil passages 38A into the oil pan 90, where it is collected with the used engine oil. Pump 130 is activated and the spent fluids pumped from oil pan 90 through valve 7, main waste line 146, pump line 142 and waste conveying line 144 into waste receptacle 122. Upon completion of the removal of the spent fluids, pump 130 is shut down and valve 7 closed. Pump 128 can then be activated, thereby introducing fresh oil from fresh oil holding tank 120 through fresh oil line 129 in which pump 128 is located. The fresh oil passes through main fluid conveying line 134, into line 127A across valve 6 past quick disconnect coupling members 70, 112 and into the mounting adapter 12 of the present invention. From there the fresh oil passes through the oil filter unit and into the internal engine oil passages, thereby prelubricating the various engine components as well as providing for a full oil filter at the time of start up. This feature eliminates the momentary starvation of lubricating oil experienced in conventional arrangements, where the oil must first fill the empty filter before it reaches the various lubricating points.

In this manner, effective economically, environmentally safe oil change and engine cleaning operations can be accomplished.

What is claimed is:

1. An oil filter mounting adapter directly connectable with an internal lube oil passage system and the oil pump discharge passage of the engine block of an internal combustion engine, the mounting adapter comprising:

a sandwich adapter having a first face adapted to sealingly contact the engine block and to overlay associated openings in the internal lube oil passage system and the oil pump discharge passage, a second face adapted to sealingly connect with an associated oil filter unit, said sandwich adapter having at least one engine oil entry opening in proximity to the associated opening in the internal lube oil passage system, at least one engine oil exit opening proximate to said oil filter unit, a central through bore extending laterally through said sandwich adapter from said first face to said second face, and means for introducing and removing fluids through said sandwich adapter, wherein said fluid introduction means comprises a flush fluid inlet opening in fluid communication with a first end of an inlet channel, said inlet channel having said first end and a second end, and wherein said fluid removal means comprises a flush fluid outlet opening in fluid communication with a first end of an exit channel, said inlet channel having said first end and a second end;

an inlet hose having a first end connected to said flush fluid inlet opening and a second end releasably connectable with an external pump device;

an outlet hose having a first end connected to said flush fluid outlet opening and a second end releasably connectable with an external pump device; and a nipple located in and extending through said central through bore, said nipple comprising:
 a) a conduit having a hollow body, said hollow body having first and second opposed ends and at least one aperture centrally located therebetween, said first end adapted to matingly connect with the associated opening in the internal lube oil passage system, and said second end adapted to matingly connect with said oil filter unit;
 b) means for releasably and matingly connecting said first conduit end with said filter orifice in the lube oil passage system; and
 c) means for releasably and matingly connecting said second conduit end with an exit portal located in said oil filter unit.

2. The mounting adapter of claim 1 wherein said aperture defined in said nipple conduit is positioned adjacent to and in fluid communication with said second end of said inlet channel opposed to said plush fluid inlet opening.

3. The mounting adapter of claim 1 wherein said oil filter unit comprises:
 an outer housing having a base and at least one side wall extending angularly outwardly therefrom, said base and said sidewall defining an inner cavity;
 a lid sealingly attached to said housing, said lid having means for permitting channeled ingress and egress of fluids from and within said inner cavity of said housing; and
 filtration media disposed within said inner cavity.

4. The filter unit of claim 3 wherein said filtration media comprises a solvent-resistant material which permits multidirectional free movement of organic fluids of various viscosities therethrough and retention of solid and semi-solid particulate material thereon.

5. The filter unit of claim 4 wherein said filtration material comprises a plurality of filaments randomly oriented and interwoven into a mesh.

6. The filtration material of claim 5 wherein said filaments consist essentially of a metal mesh material.

7. A process for cleaning and reconditioning an engine oil filter in position and in fluid communication with an associated internal combustion engine, the engine oil filter unit being releasably mounted on an oil filter mounting adapter, the adapter being directly connectable with an internal lube oil passage system and an oil pump discharge passage of the engine block of the internal combustion engine, the adapter further having at least one exterior inlet and outlet, the process comprising the steps of:
 introducing an amount of purge gas through the exterior inlet of the oil filter mounting adaptor into contact with the filtration media and the inner cavity of the oil filter unit, the amount of purge gas being sufficient to remove residual spent oil from the oil filter unit;
 introducing a suitable flushing fluid through the exterior inlet in the filter mounting adapter into contact with the internal cavity and filtration media contained therein;
 circulating said introduced flushing fluid within said filter housing in a manner to facilitate dislodgement of contaminants and particulate material contained on said filtration media;
 removing said circulated flushing fluid from the oil filtration unit through the exterior outlet in the filter mounting adapter after said dislodgement of said particulate material and said contaminants from said filtration media; and
 introducing a measured portion of fresh oil into the filter unit after removal of said flushing fluid with said particulate material and said contaminants from said filtration media.

8. A process for cleaning and reconditioning an engine oil filter unit, the filter unit having an outer housing defining an internal cavity and filtration media contained therein, the process comprising the steps of:
 introducing a suitable flushing fluid into contact with the internal cavity and filtration media contained therein;
 circulating said introduced flushing fluid within said filter housing for an interval sufficient to facilitate dislodgement of said contaminants and said particulate material, said introduced flushing fluid circulating in a direction opposed to conventional circulation of engine oil; and
 removing said circulated flushing fluid from oil filter unit after said dislodgement of said particulate material and said contaminants from said filtration media, wherein spent oil circulates through the filtration media in a first direction during intervals of engine operation and wherein said flushing fluid is circulated through the filtration media in a second direction opposed to said first direction of spent oil circulation, said flushing fluid circulation occurring during intervals when said interval combustion engine is idle.

9. The process of claim 8 wherein said circulating flushing fluid retains said contaminants and particulate material after contacting the filtration media, said flushing fluid then being brought into contact with an external fluid filter unit capable of retaining said contaminants and particulate material after said circulating flushing fluid is brought into contact therewith.

10. The process of claim 7 further comprising the step of:
 introducing a measured amount of purge gas into contact with said filtration media after removal of the introduced flushing fluid said purge gas sufficient to dislodge any residual flushing fluid from the filtration media and the internal cavity.

11. The process of claim 7 wherein the oil filter unit comprises:
   an outer housing having a base and at least one side wall extending angularly outwardly therefrom, said base and said sidewall defining an inner cavity;
   a lid sealingly attached to said housing, said lid having means for permitting channeled ingress and egress of fluids from and within said inner cavity of said housing; and
   filtration media disposed within said inner cavity.

12. The process of claim 11 wherein the oil filter unit comprises:
   a filtration media comprising a solvent-resistant material which permits frictionless, essentially wear-resistant movement of engine lube oil in a first flow direction and frictionless, essentially wear-resistant movement of said introduced flushing fluid in a second flow direction opposed to said first direction
   said first flow direction being established and occurring during intervals of internal combustion engine operation, said second flow direction being established and occurring after removal of spent oil from the oil filter unit and introduction of flushing fluid thereto.

* * * * *